Patented Apr. 5, 1949

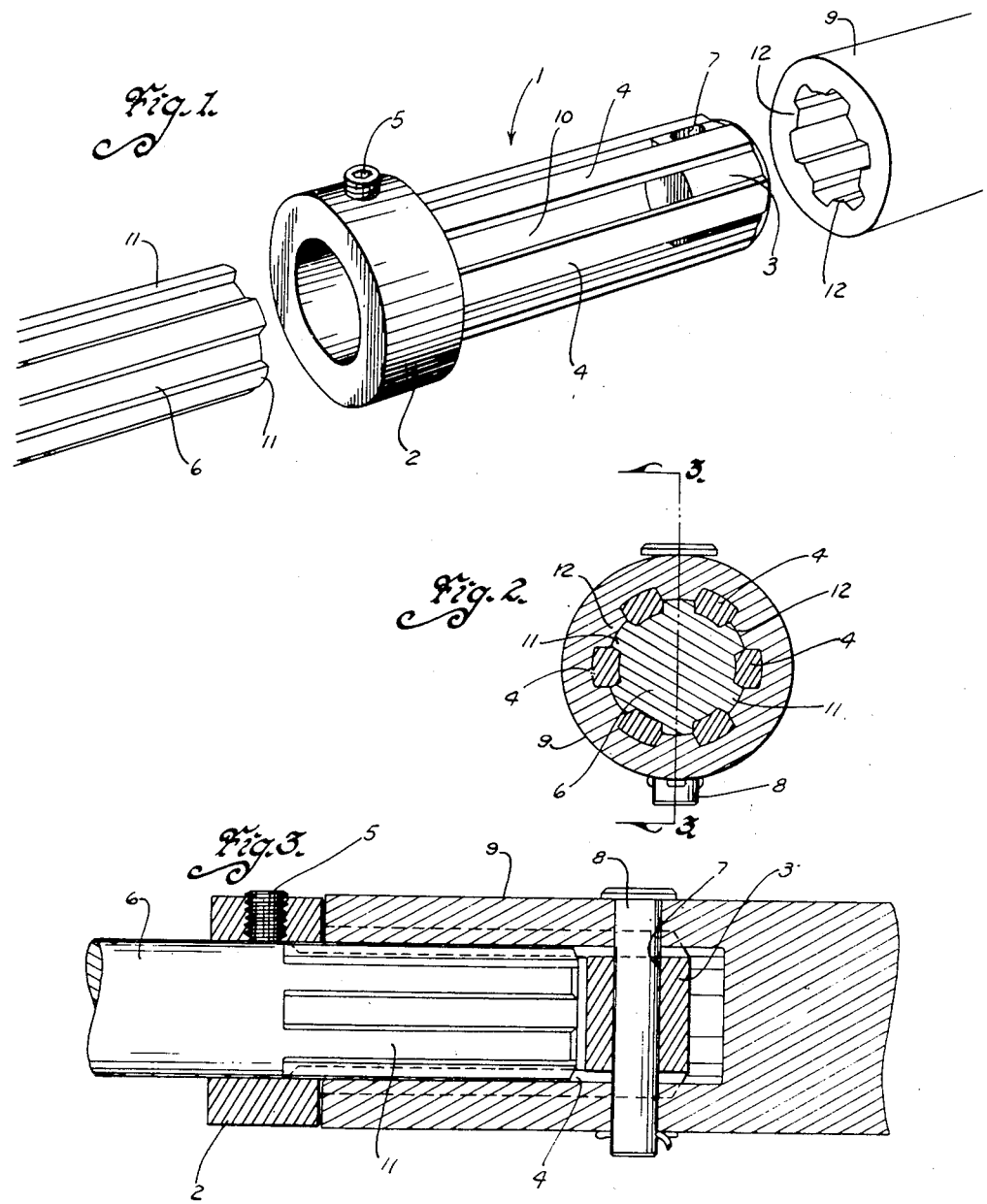

2,466,097

UNITED STATES PATENT OFFICE 2,466,097

ADAPTER COUPLING

Lyle H. Graue, Paton, Iowa

Application August 23, 1948, Serial No. 45,660

5 Claims. (Cl. 287—1)

This invention relates to an adaptor for coupling a shaft and a knuckle together and more particularly to an adaptor to be attached to a power take-off shaft from a tractor so the shaft may be attached to a knuckle on a power operated farm implement.

The tractor and farm implement industries have now settled upon a standard for the power take-off shafts from a tractor and the knuckles on farm implements to which the tractor power take-off shafts attach. The dimension has been set as 1⅜ inches. Many tractors are still in operation that have a 1⅛ inch power take-off shaft. It is with the problem of adapting a 1⅛ inch power take-off shaft to fit a 1⅜ inch knuckle that the present invention is concerned.

It is an object of the invention, among others, to provide an adaptor attachable to the shaft of a tractor power take-off that will allow the power take-off to be attached to a knuckle of larger size than the power take-off shaft with a minimum of effort.

It is a further object of the invention to provide an adaptor that allows a power take-off shaft of a tractor to be coupled to a knuckle on a farm implement when the knuckle is larger than the power take-off shaft without changing the power take-off shaft on the tractor or the knuckle on the farm implement.

It is a still further object of the invention to provide an adaptor that is simple in construction and operation, easy to operate and economical both in construction and operation; an adaptor that is long lasting and durable in operation, with no lost time in operation; an adaptor that is easy to mount, simple in design and requires no special skill on the part of an operator to mount on a tractor or to couple to a farm implement knuckle and an adaptor that can be supplied at a reasonable price on the market.

With the foregoing and other objects in view, the invention will be more fully described hereinwith and will be particularly pointed out in the claims appended hereto.

In the drawings, wherein like symbols refer to like or corresponding parts throughout the several views:

Figure 1 is an elevational view of the adaptor showing the power take-off shaft and the knuckle at each end of the adaptor.

Figure 2 is a sectional view through the adaptor, power take-off shaft and knuckle when coupled together.

Figure 3 is a sectional view taken through the line 3—3 of Figure 2.

The adaptor is represented generally at 1 and comprises a collar 2 at one end and a rod 3 at the other end. Splines 4 are attached to the collar 2 and rod 3. A set screw 5 is screw-threaded into the collar 2 and serves as a means to attach the adaptor 1 to a power take-off shaft 6. The rod 3 has an opening 7 therethrough to receive a pin 8 which pin 8 also passes through a knuckle 9 to secure the shaft 6, adaptor 1 and knuckle 9 in coupled position.

The power take-off shaft 6 is 1⅛ inches in diameter and the knuckle 9 is 1⅜ inches in diameter; hence a coupling could not be made by entering the shaft 6 directly into the knuckle 9. The adaptor 1 serves the purpose of compensating for the one-quarter inch difference in diameter between the shaft 6 and the knuckle 9.

The adaptor 1 has a central opening 10 into which the shaft 6 enters. The shaft 6 passes through the collar 2 and into the central opening 10. Splines 11 on the shaft 6 enter between the splines 4 on the adaptor 1 and contact half of the exposed side area of the splines 4 on the adaptor 1. When the shaft 6 contacts the rod 3 at the opposite end of the adaptor 1, the set screw 5 is tightened down against the shaft 6 and the adaptor 1 becomes a part of the shaft 6.

The shaft 6 and adaptor 1 are entered into the knuckle 9 which has spaced splines 12. The splines 4 fit between the splines 12 and the splines 12 contact the remaining half exposed side area of the splines 4. The coupling has now been effected so that torque may be transmitted through the power take-off shaft 6 through the adaptor 1 to the knuckle 9. To prevent longitudinal separation, pin 8 is entered through knuckle 9 and opening 7 in the adaptor 1.

It can thus be seen that the present structure allows coupling to be made between coupling members of different sizes quickly and with a minimum of effort and insure that torque will be transmitted with a minimum of strain on the adaptor.

It will be understood that the invention has been described for purposes of illustration and explanation and that changes and variations are possible without departing from the scope of the invention; all such modifications and changes are intended to be included in the appended claims.

I claim:

1. An adaptor to join a shaft having external splines to a knuckle having internal splines wherein the external diameter of the shaft is of a smaller diameter than the internal diameter of the knuckle comprising, a collar at one end, a rod at the other end, and splines between the collar and rod with which the splines from the shaft and knuckle cooperate.

2. An adaptor to join a shaft having external splines to a knuckle having internal splines wherein the external diameter of the shaft is of a smaller diameter than the internal diameter of the knuckle comprising, a collar at one end, a rod at the other end, means associated with the collar to attach the adaptor to said shaft, and splines between the collar and rod with which the splines from the shaft and knuckle cooperate.

3. An adaptor to join a shaft having external splines to a knuckle having internal splines wherein the external diameter of the shaft is of a smaller diameter than the internal diameter of the knuckle comprising, a collar at one end, a rod at the other end, means associated with the collar to attach the adaptor to the shaft, said rod and knuckle having alignable transverse openings therein, a pin insertable within said openings to lock said adaptor with said knuckle, and splines between the collar and rod with which the splines on said shaft and knuckle cooperate.

4. An adaptor to join a shaft having external splines to a knuckle having internal splines wherein the external diameter of the shaft is of a smaller diameter than the internal diameter of the knuckle comprising, a collar at one end, a rod at the other end, means associated with the collar to attach the adaptor to the shaft, and splines between said collar and rod, with the splines on the shaft passing through said collar and between the splines on the adaptor, and said knuckle fitting over the rod with the splines thereof fitting between the splines on the adaptor.

5. An adaptor to join a shaft having external splines to a knuckle having internal splines wherein the external diameter of the shaft is of a smaller diameter than the internal diameter of the knuckle comprising, a collar at one end, a rod at the other end, and splines extended between said collar and rod, with said shaft being insertable through said collar such that the splines thereof are in contact engagement with one half of the exposed side areas of the splines on said adaptor, and said rod being receivable within said knuckle such that the splines on the knuckle are in contact engagement with the remaining one-half of the side areas of the splines on the adaptor.

LYLE H. GRAUE.

No references cited.